No. 723,716. PATENTED MAR. 24, 1903.
G. W. NEWMAN & W. H. YOUNG.
EDUCATIONAL DEVICE FOR TEACHING TELEGRAPHY.
APPLICATION FILED DEC. 26, 1902.
NO MODEL.
BEST AVAILABLE COPY
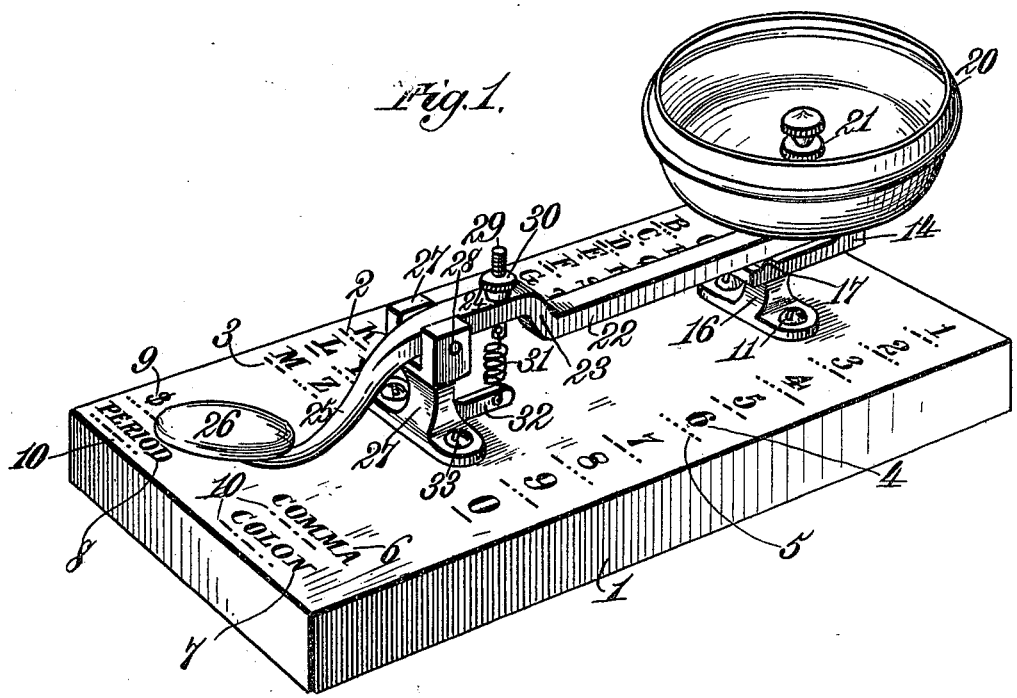
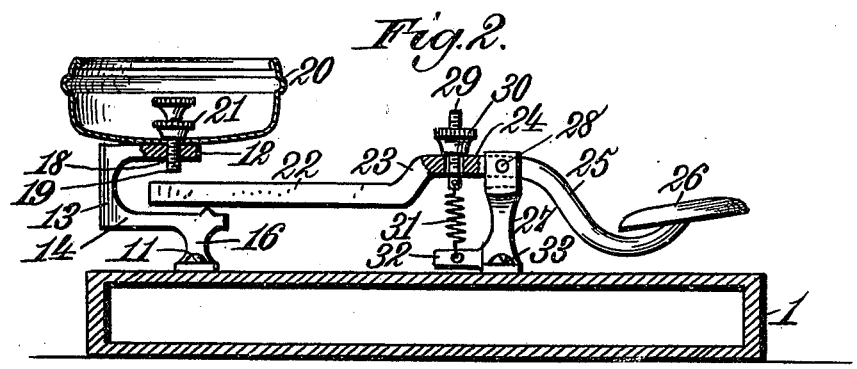
Witnesses.
Robert Everett
N. L. Bogan
Inventors.
George W. Newman,
William H. Young,
By James L. Norris
Atty.
THE NORRIS PETERS CO., PHOTO-LITHO., WASHINGTON, D. C.

UNITED STATES PATENT OFFICE.

GEORGE W. NEWMAN AND WILLIAM H. YOUNG, OF EVANSVILLE, INDIANA.

EDUCATIONAL DEVICE FOR TEACHING TELEGRAPHY.

SPECIFICATION forming part of Letters Patent No. 723,716, dated March 24, 1903.

Application filed December 26, 1902. Serial No. 136,595. (No model.)

*To all whom it may concern:*

Be it known that we, GEORGE W. NEWMAN and WILLIAM H. YOUNG, citizens of the United States, residing at Evansville, in the county of Vanderburg and State of Indiana, have invented new and useful Improvements in Educational Devices for Teaching Telegraphy, of which the following is a specification.

This invention relates to certain new and useful improvements in educational devices, and is particularly adapted for teaching and practicing telegraphy.

The invention aims to provide an educational device which may be termed a "wireless batteryless telegraphic sounding-key."

The invention further aims to construct an educational telegraphic instrument which shall be extremely simple in its construction, strong, durable, instructive in its use, and comparatively inexpensive to manufacture.

With the above and other objects in view the invention consists of the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, and in which—

Figure 1 is a perspective view, and Fig. 2 is a sectional side elevation.

Referring to the drawings by reference characters, 1 denotes the base, which is preferably rectangular in contour, although any form of base may be employed, and the base may be constructed of any suitable material. The base 1 is preferably hollow, but may be solid, if desired. It is evident when a hollow base is used that the sound when the instrument is operated will be increased. Upon the upper face of the base 1 is stamped, printed, embossed, or otherwise placed thereon the Arabic alphabet, as indicated by the reference character 2, and below each of the letters forming the said alphabet 2 is arranged its synonym of the Morse telegraphic alphabet, as shown at 3. The upper face of the base is also provided in a like manner with the numerals "1," "2," "3," "4," "5," "6," "7," "8," "9," and "0," as at 4, and below each of the numerals is arranged its synonym of the Morse telegraphic alphabet, as at 5. The base is provided in a like manner with the following words: "Comma," "Colon," and "Period" and the "$," as at 6, 7, 8, and 9, and below each of these words and the "$" is arranged its synonym of the Morse telegraphic alphabet, as at 10.

Secured to the upper face of the base by means of the screws 11 or other suitable fastening means is the sounding-bar of the instrument. The sounding-bar is preferably U-shaped in contour and is constructed with an upper arm 12, an intermediate arm 13, and lower arm 14. The latter is formed integral with the depending support 16, through which extends the fastening means 11, so that the sounding-bar can be connected to and supported upon the base. The upper face of the lower arm 14 near its free end is formed with a transversely-extending ridge 17, and the lower arm 14 is of greater length than the upper arm 12. The latter is provided with a screw-threaded opening 18, through which extends the adjustable sounding-screw 19. The latter is adapted to connect to the upper arm 12 of the sounding-bar the resonator 20, which is substantially cup-shaped, the bottom thereof resting upon the top of the upper arm 12. The adjustable sounding-screw 19 carries a nut 21, which is adapted to engage the upper face of the bottom of the resonator 20, so that it will permit of the adjusting of the sounding-screw 19 and at the same time securely hold the resonator 20 in position. The nut 21 may be called a "clamping-nut," and its purpose is to clamp the resonator in position, at the same time permitting of the vertical adjusting of the screw 19.

The reference character 22 denotes a key which is adapted to extend normally between the upper and lower arms 12 and 14 of the sounding-bar. The key 22 is constructed so that it will extend a part of its length in a longitudinal manner and then is bent upwardly, as at 23, and then longitudinally, as at 24, and then downwardly in a curvilinear manner, as at 25, the end of the curvilinear portion 25 being adapted to have secured to it the finger-button 26. The key 22 is pivoted in the supporting-bracket 27 by means of a pin or stud 28, connected to the upper portion of the bracket and extending through the longitudinal portion 24 of the key. The longitudinal portion 24 is provided with an opening through which extends the adjusting-screw 29, carrying the adjusting-nut 30. The lower end of the adjusting-screw 29 is connected to a coil tension-spring 31, while the lower end of the spring 31 is connected to a projection 32, formed integral with the bottom of the bracket 27. The latter is connected to the upper face of the base by means of the screws 33 or other suitable fastening means.

The instrument is constructed in such a manner as to dispense with batteries or wires, so under the circumstances it can be termed a "wireless" and "batteryless" telegraphic instrument, and it will be evident that when the scholar desires to use the instrument for the purpose of instruction in the Morse telegraphic alphabet he can refer to the Arabic character desired and then below the said character to its synonym of the Morse alphabet and operate the key to produce the proper sound.

It will be evident that the operation of the device is that by depressing the key the same makes an upstroke or click and that the spring pulls the key back to make the down or second stroke, the upstroke being the engagement of the key with the screw 19 and the down or second stroke being the engagement of the key with the ridge 17 of the lower arm 14. The end of the key 22 is so arranged in the sounding-bar that by regulating the screw 19 the click or sound can be increased or diminished, and the spring 31 can be so tensioned that the key 22 can be worked with a light or heavy stroke. The resonator upon the sounding-bar is adapted to cause the sound to be a metallic one when the key is operated.

It is thought the many advantages of an educational appliance for teaching telegraphy can be readily understood from the foregoing description, taken in connection with the accompanying drawings, and it will furthermore be evident that changes, variations, and modifications can be resorted to without departing from the spirit of the invention or sacrificing any of its advantages, and we therefore do not wish to restrict ourselves to the details of construction hereinbefore described and as shown in the accompanying drawings, but reserve the right to make such changes, variations, and modifications as come properly within the scope of the protection prayed.

Having thus fully described our invention, what we claim as new, and desire to secure by Letters Patent, is—

1. An educational appliance comprising a base having its upper face provided with characters and the synonyms therefor according to the Morse telegraphic alphabet, a sounding-bar mounted upon said base, a resonator connected to the top of said sounding-bar, and a spring-returned key mounted upon the base and extending in said bar.

2. An educational appliance consisting of a base, a sounding-bar supported thereby, a cup-shaped resonator secured to the top of said bar, and a spring-returned key mounted upon said base and extending in said bar.

3. An educational appliance consisting of a hollow base, a sounding-bar supported thereby, a cup-shaped resonator secured to the top of said bar, and a spring-returned key mounted upon said base and extending in said bar.

4. An educational appliance comprising a base, a sounding-bar mounted thereon, a cup-shaped resonator secured to the top of said bar, a pivotal key extending in said bar, means secured to the base for pivotally supporting the said key, and a spring adjustably connected at one end to said key and fixedly connected at its other end to said means.

5. An educational appliance comprising a hollow base, a sounding-bar mounted thereon, a cup-shaped resonator secured to the top of said bar, a pivotal key extending in said bar, means secured to the base for pivotally supporting the said key, and a spring adjustably connected at one end to said key and fixedly connected at its other end to said means.

6. An educational appliance comprising a base having its upper face provided with characters and the synonyms therefor according to the Morse telegraphic alphabet, a sounding-bar mounted thereon, a cup-shaped resonator secured to the top of said bar, a pivotal key extending in said bar, means secured to the base for pivotally supporting the said key, and a spring adjustably connected at one end to said key and fixedly connected at its other end to said means.

7. An educational appliance comprising a hollow base having its upper face provided with characters and the synonyms therefor according to the Morse telegraphic alphabet, a sounding-bar mounted thereon, a cup-shaped resonator secured to the top of said bar, a pivotal key extending in said bar, means secured to the base for pivotally supporting the said key, and a spring adjustably connected at one end to said key and fixedly connected at its other end to said means.

8. An educational appliance comprising a base having its upper face provided with characters and the synonyms therefor according to the Morse telegraphic alphabet, a sounding-bar supported by said base and comprising an upper, lower and intermediate arm, said lower arm provided with a ridge, a cup-shaped resonator mounted upon the upper arm of the sounding-bar, an adjustable screw adapted to connect said resonator to the upper arm of said sounding-bar, a pivotal key extending between the upper and lower arm of said sounding-bar, means secured to the base for pivotally supporting the said key, an adjustable screw extending through said key, a spring having one end connected to the lower end of said screw and its other end to the said means, and a finger-piece secured to said key.

9. An educational appliance comprising a hollow base having its upper face provided with characters and the synonyms therefor according to the Morse telegraphic alphabet, a sounding-bar supported by said base and comprising an upper, lower and intermediate arm, said lower arm provided with a ridge, a cup-shaped resonator mounted upon the upper arm of the sounding-bar, an adjustable screw adapted to connect said resonator to the upper arm of said sounding-bar, a pivotal key extending between the upper and lower arm of said sounding-bar, means secured to the base for pivotally supporting the said key, an adjustable screw extending through said key, a spring having one end connected to the lower end of said screw and its other end to the said means, and a finger-piece secured to said key.

In testimony whereof we have hereunto set our hands in presence of two subscribing witnesses.

GEORGE W. NEWMAN.
WILLIAM H. YOUNG.

Witnesses:
ELMER S. FINNEY,
WILLIAM BEDFORD.